Dec. 26, 1950 M. J. BURGER ET AL 2,535,667
TORQUE CONTROLLING MECHANISM
Filed Nov. 10, 1949 4 Sheets-Sheet 1
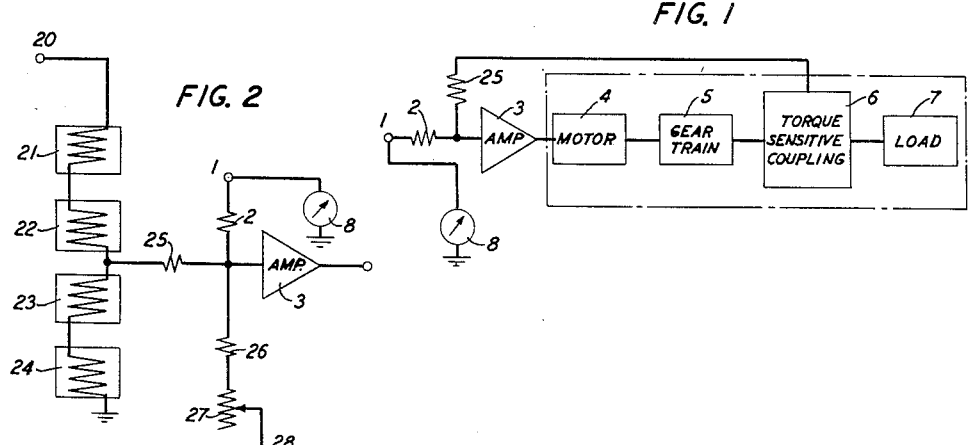
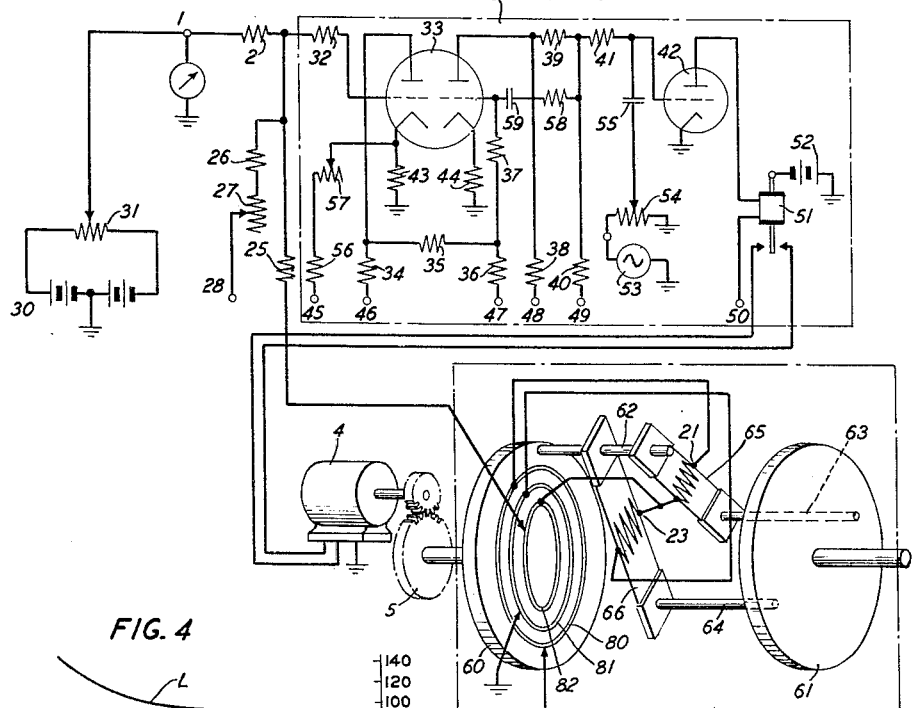
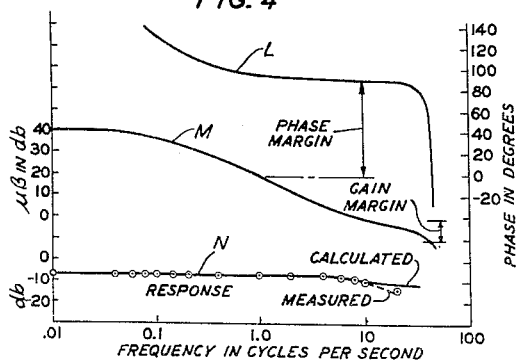
INVENTORS: M. J. BURGER
G. F. CLEMENT
BY W. H. Dawson
ATTORNEY

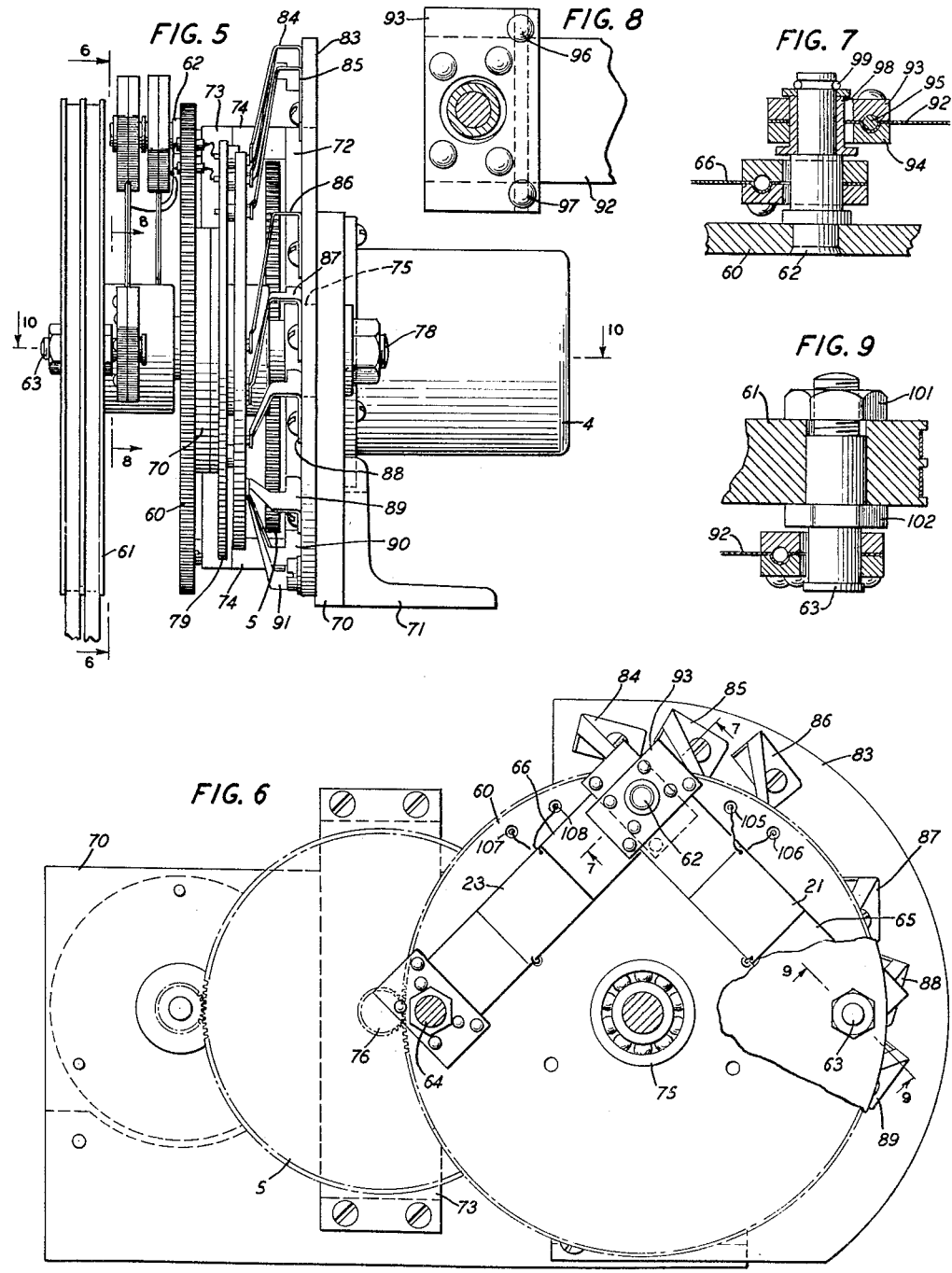

Dec. 26, 1950 M. J. BURGER ET AL 2,535,667
TORQUE CONTROLLING MECHANISM
Filed Nov. 10, 1949 4 Sheets-Sheet 3
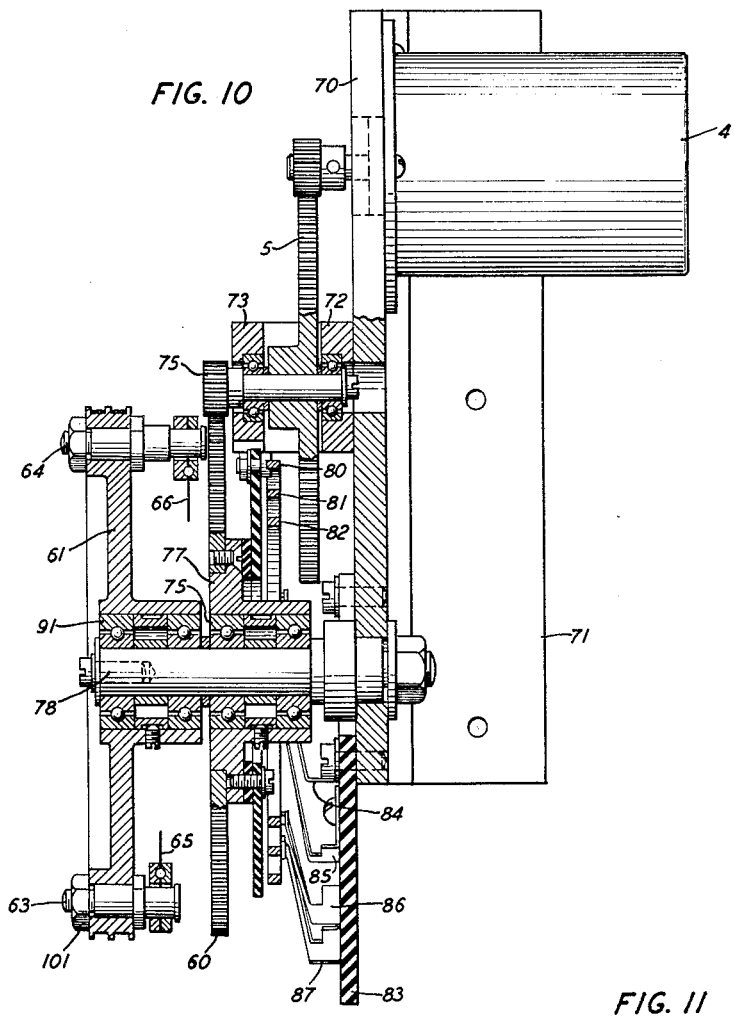
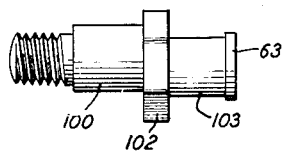
INVENTORS: M. J. BURGER
G. F. CLEMENT
BY
*W. Dawson*
ATTORNEY

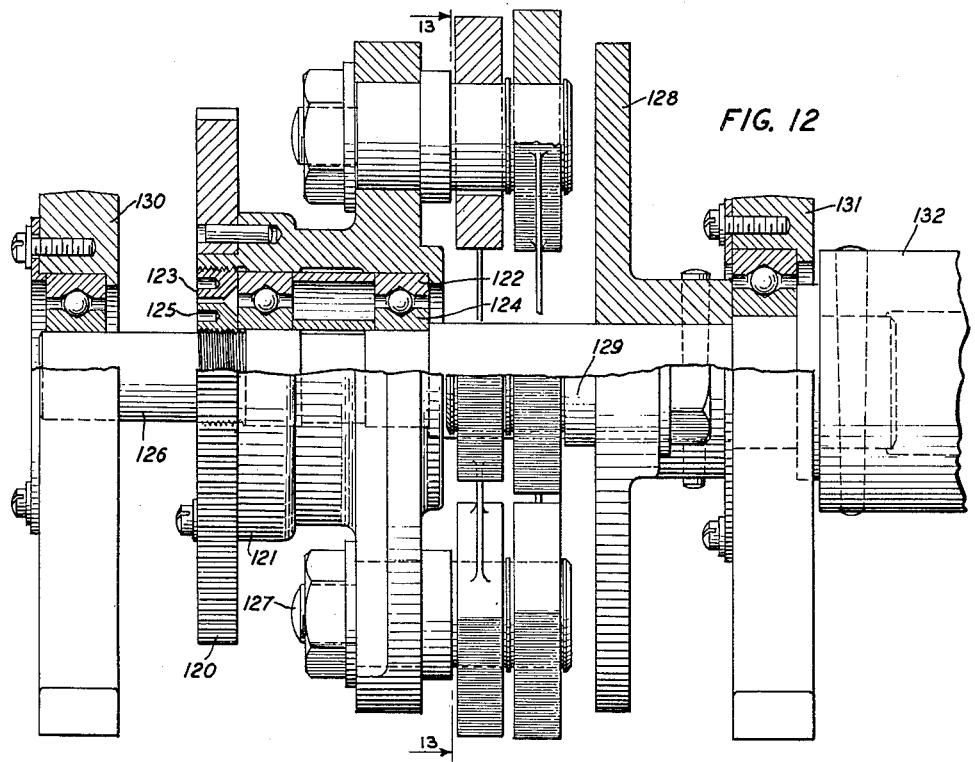
FIG. 12
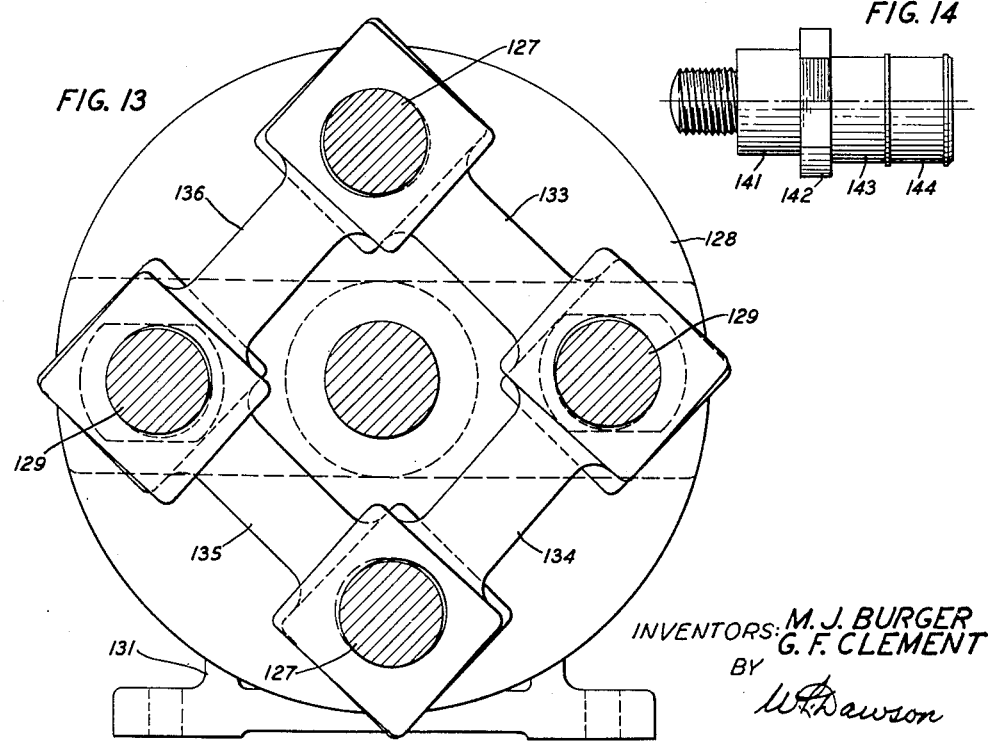
FIG. 13
FIG. 14
INVENTORS: M. J. BURGER
G. F. CLEMENT
BY
W. F. Dawson
ATTORNEY

Patented Dec. 26, 1950

2,535,667

UNITED STATES PATENT OFFICE 2,535,667

TORQUE CONTROLLING MECHANISM

Michael J. Burger, Murray Hill, and George F. Clement, East Orange, N. J., assignors to Bell Telephone Laboratories, Incorporated, New York, N. Y., a corporation of New York Application November 10, 1949, Serial No. 126,574

7 Claims. (Cl. 318—432)

This invention relates to a torque controlling and torque measuring apparatus.

One object of the invention is an apparatus producing clockwise, or counter-clockwise, torques of all values from zero to the maximum capability of a prime mover.

Another object of the invention is an apparatus producing clockwise, or counter-clockwise, torques proportional to a voltage.

Another object of the invention is an apparatus producing controllable clockwise, or counter-clockwise torques which are independent of the position or speed of a driven shaft.

Another object of the invention is an apparatus for measuring the torques of torque producing shafts regardless of their speed or positions.

A feature of the invention is a simple and efficient device, substantially free of temperature effects, which directly measures the forces involved in the production of torques.

In known torque determining apparatus, such as the absorption dynamometer, a rotary member, such as a shaft, is connected to the dynamometer. The dynamometer absorbs the output power of the rotary member by mechanical, hydraulic, or electric means, and usually converts this output power into heat, though in some cases, a portion of the power is converted into useful work. The dynamometer provides some indirect indication, such as the pull on the lever arm of a prony brake or the current from a generator, by which the torque may be determined. Readings are taken at various speeds, and from these readings, and simultaneous measurements of the corresponding speeds, the composite torque-speed characteristic is determined, and the power output may be evaluated. Such apparatus does not give direct readings of the forces producing the torques, is not readily reversible for the measurement of reciprocating or reversible torques, and cannot measure the torque of a stalled prime mover.

In accordance with the present invention, a prime mover is connected through a strain sensitive coupling to a load. The torque of the prime mover is controlled by electrical means; and the strain sensitive coupling produces an electrical effect which is proportional to the stress producing the strain, and is therefore proportional to the force producing the torque. This electrical effect is fed back to oppose the electrical effect controlling the prime mover, thus compelling the prime mover to produce a torque of such magnitude that the resultant of these two electrical effects will cause the prime mover to produce the proper torque. As the electrical effect which is fed back is proportional to the force producing the torque, this effect is a convenient measure of the torque.

In addition to measuring the torque transmitted to a load, apparatus embodying the present invention may be used to supply a measured torque to an element rotated by some other source, regardless of its speed, to aid, or oppose, the torque due to this other source. Also, if the output shaft be held against rotation, the apparatus will supply the required torque to the shaft within the limits of the prime mover.

The strain sensitive coupling may include two opposed discs, or crank arms, respectively affixed to the shaft of the prime mover and the output shaft. One, or more, pins are mounted on the driving disc and one or more pins on the driven disc, in overlapping relationship. One, or more, links, which may be in the form of flat webs, interconnect the pins on the driving and driven discs and transmit the forces which produce the torque. A plurality of strain sensitive elements, such as resistance strain gauges, are mounted on these links to produce an electrical effect proportional to the strain in the links.

The invention will be better understood from the attached drawings, in which:

Fig. 1 is a block schematic of a system embodying the invention;

Fig. 2 is a detail schematic of the input connections to the amplifier of Fig. 1;

Fig. 3 is a detail showing, partly schematic and partly diagrammatic, of the system of Fig. 1;

Fig. 4 shows certain characteristics of the system shown in Fig. 3;

Fig. 5 is a side elevation of the motor and coupling of Fig. 3;

Fig. 6 is an end elevation of the apparatus of Fig. 5;

Fig. 7 is a sectional detail of the attachment of the links to the concentric pin;

Figs. 8 and 9 show the attachment of a link to an eccentric pin;

Fig. 10 shows a plan view in part section of the motor and coupling;

Fig. 11 shows an eccentric pin;

Fig. 12 shows a side elevation in part section of another strain sensitive coupling;

Fig. 13 shows a sectional elevation along the line 13—13 of Fig. 12; and

Fig. 14 shows the eccentric pins used in the coupling shown in Fig. 12.

In Fig. 1, a voltage applied through terminal 1 and resistor 2 to the input circuit of amplifier 3 controls the power supplied to motor 4 which drives, through gear train 5 and torque sensitive coupling 6, a load 7. The voltage developed by the torque sensitive coupling 6 is fed back through resistor 25 to the input circuit of amplifier 3 to oppose the applied voltage. A meter 8 reads the applied voltage and indicates the torque supplied to the load.

If the over-all loop gain is high, the resultant voltage supplied to the input circuit of the amplifier 3 to control motor 4 is small, and the voltage fed back from the torque sensitive coupling is very nearly equal to the voltage applied to the terminal 1, and indicated by the meter 8. Thus, by applying an appropriate voltage to the terminal 1, the system will supply a desired torque to the load 7. If the load 7 is replaced by a torque producing device, the applied voltage may be adjusted to produce a torque which causes the torque producing device to rotate at any desired speed, and the meter 8 will indicate the torque supplied. Any suitable speed indicating device, such as a tachometer or stroboscope, may be used to determine the speed of the output shaft.

In Fig. 2, the connections to the input circuit of amplifier 3 are shown in more detail. The elements 21, 22, 23, 24, are four resistance strain gauges embodied in the torque sensitive coupling 6. One pole, say the negative pole, of a grounded source of voltage (not shown) is connected by terminal 20 in series with the gauges 21, 22, 23, 24. The junction of gauges 22, 23 is connected through the coupling resistor 25 to the input circuit of amplifier 3. The opposite pole, in this case, the positive pole of a grounded source (not shown) is connected by terminal 28 in series with adjustable resistor 27 and resistor 26 to the input circuit of amplifier 3, to send a current through elements 23, 24, opposing the current from the source connected to terminal 20, so that, by adjustment of resistor 27, the resultant voltage drop across elements 23, 24, will initially be of a suitable value to bias the amplifier 3. When the elements 21, 22, 23, 24 are strained, their resistances are changed, thus changing the voltage drop across elements 23, 24 which is supplied to the input circuit of amplifier 3. A voltage applied to connection 1 will cause the motor to turn, straining the elements 21, 22, 23, 24 and producing a voltage which is supplied through resistor 25 to oppose the applied voltage.

In Fig. 3, the grounded source of voltage 30, having its poles connected to the winding of a potentiometer 31, symbolically represents a controllable source of a voltage applied through terminal 1 and resistors 2, 32, to the control electrode of the first section of a twin triode 33, incorporated in the amplifier 3. The anode of this first section is connected to the control grid of the second section by an interstage network of the type disclosed in United States Patent 1,751,527, March 25, 1930, H. Nyquist, comprising resistors 34, 35, 36, and decoupling resistor 37. The anode of the second section is coupled by a similar network comprising resistors 38, 39, 40, and decoupling resistor 41, to the control electrode of the triode 42. The cathodes of the twin triode 33 are respectively grounded through self-biasing resistors 43, 44, which also supply local feedback.

The system may be energized by any suitable power supply (not shown) supplying positive potentials to terminals 28, 45, 46, 48, 50, and negative potentials to terminals 20, 47, 49.

The cathode of tube 42 is grounded, and the anode connected through the winding of relay 51 and terminal 50 to the power supply (not shown).

A suitable grounded source of power 52 is connected to the swinger of relay 51 and the contacts of relay 51 are respectively connected to ground through the windings of motor 4. A source of alternating voltage 53 is connected to the winding of potentiometer 54, and the brush of potentiometer 54 is connected through capacitor 55 to the control electrode of tube 55. The brush of potentiometer 54 is adjusted until, under no signal conditions, the swinger of relay 51 oscillates from one contact to the other contact, dwelling on each contact for substantially the same time. The positive potential is connected through terminal 45, resistor 56, adjustable resistor 57 and resistor 43, to ground, so that, by adjustment of resistor 57, the potential of the cathode of the first section of tube 33 may be varied until, under no signal conditions, the swinger of relay 51 dwells for equal times on the relay contacts, sending equal pulses of current through the motor windings. Under these conditions, the motor 4 may vibrate slightly but will not rotate. If the motor is not perfectly balanced, then this control provides for balancing to obtain no motion. When a voltage from potentiometer 31 is applied to terminal 1, the anode current of tube 42 will change, causing the swinger of relay 51 to dwell for a longer time on one contact and a shorter time on the other contact, thus sending unequal pulses of current through the windings of motor 4, and the motor 4 will develop torque in a direction determined by the polarity of the applied voltage, and will rotate at a speed determined by the amplitude of the applied voltage and the mechanical load.

The motor 4, through the gear train 5, drives the disc 60, facing the disc 61 attached to the output shaft. A stud or crank pin 62, is secured to the disc 60 in overlapping relationship to one, or more, studs or crank pins 63, 64, secured to the disc 61, and the pin 62 is connected to the pins 63, 64, by links 65, 66. The strain gauges 21, 22 are mounted on the two sides of link 65, and the strain gauges 23, 24 are mounted on the two sides of the link 66, as the use of two gauges on each link increases the sensitivity of the coupling. The rotation of pin 62 with the disc 60 will produce a tensional stress in one link, and a compressional stress in the other link, and these forces will cause the disc 61 to be rotated. The use of two sets of gauges respectively mounted on links under tension and under compression automatically compensates for a large part of the temperature error of the strain gauges. To further reduce temperature effects, the links may be made of material having a small temperature coefficient, and the coupling may be encased to reduce the effect of air draft.

The disc 60, or a disc or cylinder associated therewith, is constructed to support three slip rings 80, 81, 82. The terminal 20, connected to the power supply (not shown), is connected to the brush associated with the ring 80 connected to gauge 21. Ground is connected to the brush associated with the ring 81 connected to the gauge 24, and resistor 25 is connected to the brush associated with the ring 82 connected to the junction of gauges 22, 23.

If $R$ and $l$ be the initial resistance and length of the gauge, and $dR$, $dl$ be the changes in these quantities under strain, then, in the operating range of the gauge, $$\frac{dR}{R} = K\frac{dl}{l} \quad (1)$$

where $K$ is the sensitivity factor of the gauge. The resistance of the gauge thus increases linearly with increase in length when the gauge is under tension, and decreases with decrease in length when the gauge is under compression.

In Fig. 3, when the disc 60 is rotated counter-clockwise, the link 65 and gauges 21, 22 will be under tension, while the link 66 and gauges 23, 24 will be under compression; conversely, when the disc 60 is rotated clockwise, the link 65 and gauges 21, 22 will be under compression, while the link 66 and gauges 23, 24 will be under compression.

In Fig. 2, let the voltage applied to the terminal 20 be $E$, and the voltage at the junction of gauges 22, 23, be $e_0$, initially, and $e_1$, when the system is transmitting a torque. Assuming the gauges are similar $$e_0 = \frac{2R}{4R}E$$

When transmitting a torque, let the gauges 21, 22 increase in resistance, and gauges 23, 24 decrease in resistance, then;

$$e_1 = \frac{2(R+dR)E}{4R}$$

and the change $de$ is given by $$de = e_1 - e_0 = \frac{dR}{2R}E \quad (2)$$

The strain, $$\frac{dl}{l} = \frac{stress}{YA}$$

where $Y$ is Young's modulus for the material in the links 60, 61, and $A$ is the cross-sectional area of the links. If $T$ is the torque, $$\text{The stress} = \frac{T}{r \cos B}$$

where $r$ is the radius at which the torque is transferred to the links, and $B$ is the angle between the direction of the stress and the direction of the tangential force producing the torque. Substituting in Equation 2

$$de = \frac{KE}{2rYA \cos B} \cdot T \quad (3)$$

Hence, the voltage fed back from the strain gauges to the input circuit of amplifier 3 is directly proportional to the torque, thus the meter 8 may be calibrated to read directly in terms of the torque.

The complete system of Fig. 3 forms a feedback loop which includes the motor 4 and gear train 5, and must be designed by the usual methods applicable to feedback systems. In one embodiment of the system of Fig. 3, the phase margin and stability were improved by the addition of resistor 58 and capacitor 59 connected from the anode circuit to the control electrode of the second section of tube 33. In Fig. 4, curve M shows the estimated characteristic of the system and curve L shows the phase of the feedback system, indicating that the phase margin and gain margin are adequate for stability. As shown by curve N, the calculated values of the response-speed characteristic are in satisfactory agreement with the measured values.

The motor, gear train and torque sensitive coupling of Figs. 1 and 3 is shown in detail in Figs. 5 to 11. The motor 4 is mounted on a vertical plate 70, supported by brackets 71. The motor pinion meshes with the intermediate gear 5, having a shaft journalled in the supports 72, 73, united by the spacers 74, and supported by the plate 70. A pinion 76 on the shaft supporting gear 5 meshes with gear teeth on the periphery of the disc 60. The disc 60 is secured to a sleeve 77 rotatably mounted by the ball bearings 75 on a stub shaft 78 secured to the plate 70.

An insulating disc 79, affixed to the sleeve 77, supports three slip rings 80, 81, 82. An insulating sheet 83, affixed to the support 70, supports nine brushes, of which eight brushes 84 to 91, are shown. Three brushes bear on each slip ring to reduce the possibility of malfunctioning of the apparatus due to brush failure.

A disc 61, which may be in the form of a pulley or a gear, is rotatably supported by ball bearings 91 on the shaft 78, and is suitably connected, as by a belt, to any desired load.

For the most efficient utilization of the strain gauges, these gauges should be strained to substantially their maximum value when the apparatus is transmitting full torque. In a unit, such as the present unit, in which the full torque is quite small, the webs of the connecting links must be rather thin, so that the stresses developed will strain these links, and the gauges affixed thereto, to the desired extent.

Figs. 7, 8, 9, illustrate a convenient manner of constructing the links. Corresponding recesses are formed in the clamp plates 93, 94, and the web 92, which may be formed of some thin material such as Duralumin, is stretched over the lower plate; a short length of rod 95 is placed on the web 92 in line with the recess, the upper plate is placed in position and the two clamp plates secured together by any suitable means, such as the rivets 96, 97. The plates 93, 94 may then be further secured, if desired, by other rivets. In order to distribute the stresses evenly across the width of the web 92, it is necessary that the axis of the web 92 be accurately located 90 degrees from the front edge of the plate 94. Corresponding holes are pierced in the plates 93, 94, and the web 92, so that the assembly may be slipped over the crank pin 62 secured to the disc 60. As both links 65, 66, are driven by the pin 62, to avoid interference between the links, a shoulder is formed on the pin 62 and a sleeve 98, resting on this shoulder, is interposed between the clamping plates 93, 94 and the pin 62. The assembly may be retained in place by a wire 99 snapped into a groove in pin 62. As thin webs of this character cannot resist shearing stresses without tearing, the holes in the plates 93, 94 may be made larger than the pin 62, or sleeve 98, so that only tensile stresses are applied to the web.

If the system be irreversible, that is, the torque is always in one direction, only one link would be necessary, and this link could be arranged always to be under tension; but, in a reversible system, two links are necessary, and, while one link is under tension, the other link will be under the equivalent of compression. As a thin web of this character cannot transmit any substantial compressive stresses, it is necessary to convert the compressive stresses into the equivalent of negative tensile stresses by prestressing the web to the center of the operating range, so that a tensile stress will increase the stress in the web, while a compressive stress will reduce the stress in the web. In such case, of course, the webs must have at least twice the strength of a single web which is only subjected to tensile stress.

The links 65, 66 may conveniently be prestressed by making the pins 63, 64 eccentric, as shown in Figs. 10 and 11. The shank 100 is inserted in a hole in the disc 61, and the pin 63 may be secured by nut 101. Flats 102 are formed on the pin 63 so that a wrench may be applied to rotate the pin 63 to any desired position before the nut 101 is tightened. The clamp plates on one end of the link 65 are positioned on the portion 103, having an axis offset from the axis of the shank 100, and retained by the shoulder formed on the portion 103.

The strain gauges 21, 22, are mounted on the front and back of the link 65, Fig. 6, connected in series, and the free ends connected to terminals 105, 106 insulatingly mounted through the disc 60; while the gauges 23, 24 are similarly mounted on the front and back of the link 66 and connected to the terminals 107, 108. The terminals 105, 106, 107, 108, are connected to the corresponding slip rings 80, 81, 82, Figs. 3, 6 and 10.

Figs. 12, 13, 14 show a strain sensitive coupling adapted for the transmission of larger torques than the coupling shown in Figs. 5 to 10. The motor pinion drives the gear disc 120 which is secured to the sleeve 121, mounted on the upper ball race 122, secured by the retaining ring 123 threaded in the sleeve 121. The lower ball race 124 is mounted on the shaft 126 and secured by the retaining ring 125 threaded on the shaft 126. The sleeve 121 is shaped to form a disc, or crank arms, carrying the crank pins 127. The disc, or crank arms 128 is keyed to the shaft 126 and carries the crank pins 129, in overlapping relationship with the pins 127. The shaft 126 is rotatably mounted in ball bearings in the end standards 130, 131 and is keyed to a coupling, such as the sleeve 132, driving the load.

The links 133, 134, 135, 136 are shaped to have thin central webs, which may be secured, as by welding or brazing, to heavy end sections; or the webs may be formed integrally with the end sections. The crank pins 127, 129, as shown in Fig. 14, have a shank 141, which is bolted to the sleeve 121, or the disc 128, a flattened portion 142, and two cylindrical portions 143, 144, defined by shoulders and having a common axis offset from the axis of the shank 141. The pins 127, 129, are respectively bolted to the discs 121, 128, the links 133, 134, 135, 136, are located on the appropriate portions 143, 144 of the pins 127, 129, then the pins 127, 129, are rotated to prestrain the links, and the nuts on the pins are tightened. The strain gauges (not shown) may, as before, be secured to the two faces of the links, and the gauges which are similarly strained connected in series. To simplify the drawings, the slip rings and brushes have been omitted, but the slip rings may evidently be supported on the disc 128 and the brush holder supported by the standard 131.

For transmitting larger values of torque, the diameters of the opposed discs, or crank arms, and the number of crank pins may be increased, with a corresponding increase in the number of strain gauges.

While a specific type of electric motor, and control circuit therefor, has been disclosed, the invention is not limited thereby, but may be embodied in many other systems using motors, electric, hydraulic, steam, heat or internal combustion, which may be controlled by a suitable electrical control circuit.

What is claimed is:

1. A torque-producing apparatus, including a motor having a shaft, a source of control voltage, a circuit connecting said source and motor to control the energization of said motor, a load, opposed crank arms respectively attached to said motor shaft and said load and having overlapping crank pins, links interconnecting the overlapping crank pins including electrical elements modified by the transmitted strain to produce a voltage proportional to the torque transmitted to the load, and connections for opposing the produced voltage to the control voltage, whereby the transmitted torque is made proportional to the control voltage, and is independent of the speed or position of the load.

2. The combination in claim 1 in which the control circuit includes a high gain amplifier.

3. The combination in claim 1 in which the opposed crank arms are shaped to form opposed discs.

4. The combination in claim 1 in which the links are flat webs and the strain sensitive elements are resistance strain gauges adhesively affixed to the webs.

5. The combination in claim 1 with means connected to the control circuit to indicate the produced torque.

6. A torque-producing apparatus including a motor having a shaft, a source of control voltage, a control circuit connecting said source and said motor, a load, opposed crank arms respectively connected to said motor shaft and said load and having overlapping crank pins, links having end sections perforated to fit over a pair of overlapping crank pins and webs connecting the end sections, resistance strain gauges adhesively secured to both sides of the webs, a second source of voltage connected to said gauges, and means connecting said gauges to said control circuit to oppose the voltage from said gauges to said control voltage.

7. A torque-producing apparatus including a motor having a shaft, a source of control voltage, a high gain amplifier having an input circuit connected to said source and an output circuit controlling said motor, a load, opposed crank arms respectively connected to said shaft and said load supporting overlapping crank pins rotatably secured to the crank arms and having projecting portions eccentrically located with respect to the remainders of the pins, links having end sections perforated to fit over a pair of overlapping crank pins and webs connecting the end sections, prestrained by rotation of the crank pins, resistance strain gauges secured to both sides of the webs, a second source of voltage connected to said gauges, and means connecting said gauges to the input circuit of said amplifier to oppose the voltage from said gauges to said control voltage.

MICHAEL J. BURGER.
GEORGE F. CLEMENT.

No references cited.